3,091,267
SAW BIT
Joseph F. Fiezell, Brooklyn, N.Y., assignor to R. Hoe & Co., Inc., New York, N.Y., a corporation of New York
Filed Jan. 29, 1958, Ser. No. 711,850
1 Claim. (Cl. 143—141)

This invention relates to bits for use in inserted tooth saws.

More particularly, the invention is concerned with saws of the general type shown in prior Foster Patent No. 1,589,799 and Beisinger Patent No. 1,736,571, in which replacable bits are utilized.

The present invention has as its principal object, the production of an improved action in guiding and breaking the chip, which action, while not limited to such use, is especially applicable in severe service and in particular for cutting frozen timber.

In the patents above mentioned, the contour of the face and throat or gullet of the tooth is such as to guide the chip in an apparently smooth manner, but the present invention provides an improved contour on the inner faces of the tooth, providing a more natural flow for the chip and breaking and discharge thereof when the tooth leaves the cut.

Figure 1:
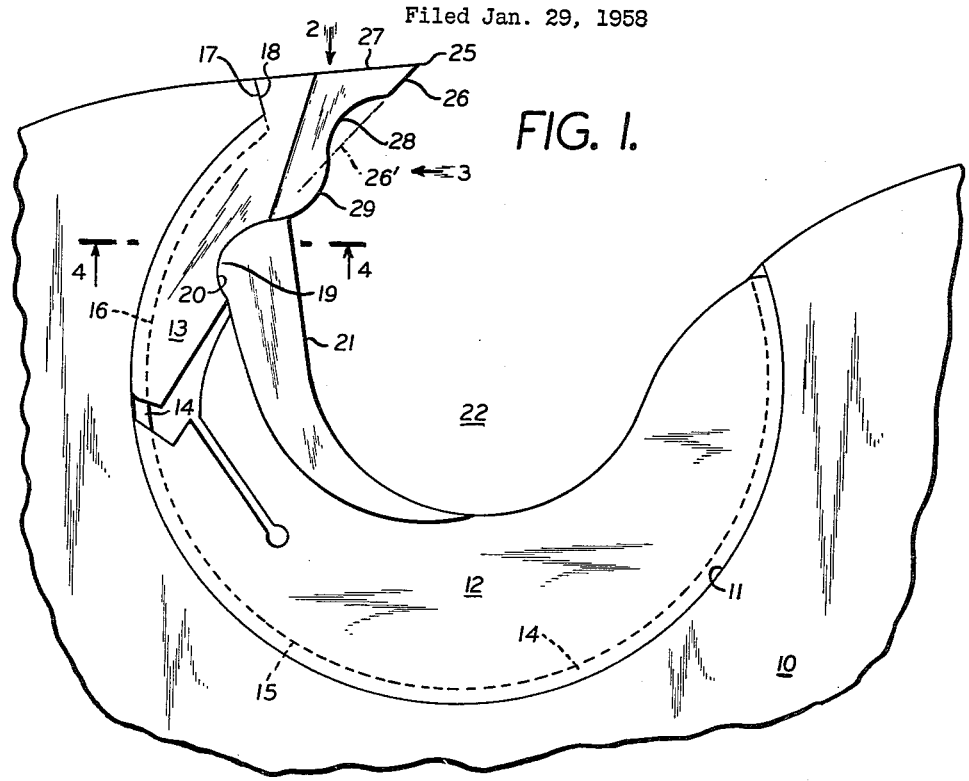
FIG. 1 is a flat elevation view of a portion of the periphery of a circular saw and showing a tooth construction embodying the invention in a preferred form.
Figure 2:
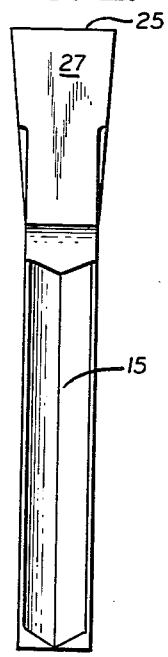
FIG. 2 is a plan elevation view of the bit of FIG. 1, and is on a somewhat enlarged scale.

In the drawing, a portion of the periphery of a disc or circular saw 10 is shown. This disc is provided with a number of generally circular sockets 11, each of which receives a tooth structure comprising a shank 12 and bit 13. The inner surface of socket 11 is formed with a V-shaped ridge 14 which fits in corresponding V-shaped grooves 15 and 16 in the socket and bit respectively. The bit has a shoulder 17 abutting against the generally radial shoulder 18 in the saw body for positioning it circumferentially and is locked in place by rounded portion 19 on the shank engaging in a recess 20 of the bit. The shank 12 generally is of the same thickness as the saw body 10, and is slightly thickened over the area 21 adjacent the open area or pocket 22 which accommodates the chips, in accordance with known practice.

The present invention is concerned primarily with the contours of the bit or bit surfaces which act upon the chip. Adjacent the cutting edge 25 is a relatively short, flat inner face 26, forming together with the peripheral surface 27, a chisel shaped cutting edge. Immediately below surface 26 is a concave circular contour 28, which is followed by a convex circular contour 29, these two contours blending together in a smooth tangential manner as indicated.

Figure 3:
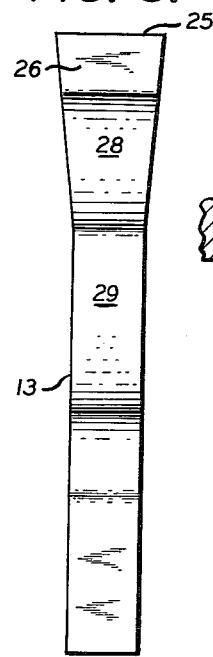
FIG. 3 is a front elevation view of the bit of FIG. 1.
Figure 4:
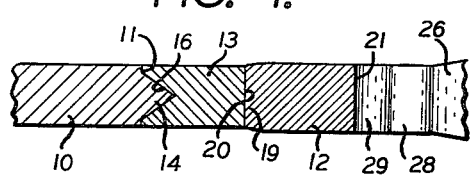
FIG. 4 is a section on the line 4—4 of FIG. 1.

When the chip is cut, it flows from the cutting edge 25 over the face 26 and into the throat area within the concavity 28. It contacts the concave-convex surfaces 28, 29 following around the convex surface 29 for about 60° of arc and then flows into the shank gullet area 22, with minimum loss of chip area. There is thus provided a smooth guiding action on the chip with no actual deflection thereof. The chip, however, in following the smooth reverse curves 28—29 is flexed first in one direction and then in the other, and is effectively broken. As will be observed from FIGS. 3 and 4, the cutting edge surface 26 and the curves 28—29, taper gradually and uniformly from the full width of cutting edge 25 down to the thickness of the shank area 21 and then to the thickness of the saw body 10, which is the thickness of the shank 12 and 13 generally.

It is found that the bit structure of the present invention provides an effective guiding and breaking of the chip without bodily deflection and hence provides effective clearing of the chips with more efficient cutting action and reduced power consumption. While the precise dimensions and configuration of the bit may vary somewhat, depending on the intended class of service, it is found that a configuration such as illustrated is satisfactory for most purposes. As will be apparent from FIG. 1, the plane of edge surface 26 if continued, as indicated by the broken line 26', is close to a plane of symmetry for the surfaces 28, 29 so that, substantially, the concave and convex guide surfaces are positioned on opposite sides of this plane. Moreover, guide surfaces, each occupying about a 60° arc as shown, have been found suitable for most applications, although the degree of curvature and in consequence the arc subtended by these surfaces may be varied somewhat without impairing the action obtained.

What is claimed is:

In an insertable bit saw, a tooth comprising a cutting edge defined by plane inner and outer surfaces and guiding surfaces comprising a reverse curve continuing generally the plane of the inner surface, the first part of which reverse curve is a concave substantially circular arc and the second part of which is a convex substantially circular arc, the two said arcs blending together smoothly and tangentially for guiding and bending the chip without bodily deflecting the same, and each subtending an angle of about 60° about its center of curvature.

References Cited in the file of this patent

UNITED STATES PATENTS

| | | |
|---|---|---|
| 409,271 | Cardiff | Aug. 20, 1889 |
| 580,950 | McCoy | Apr. 20, 1897 |
| 780,606 | Fox | Jan. 24, 1905 |
| 784,113 | Miner | Mar. 7, 1905 |
| 2,734,534 | Standal | Feb. 14, 1956 |